United States Patent
Cohen et al.

(10) Patent No.: US 8,308,968 B2
(45) Date of Patent: Nov. 13, 2012

(54) MONOLITHIC HIGH ASPECT RATIO NANO-SIZE SCANNING PROBE MICROSCOPE (SPM) TIP FORMED BY NANOWIRE GROWTH

(75) Inventors: Guy M. Cohen, Mohegan Lake, NY (US); Hendrik F. Hamann, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 12/536,156

(22) Filed: Aug. 5, 2009

(65) Prior Publication Data
US 2009/0308844 A1 Dec. 17, 2009

Related U.S. Application Data

(62) Division of application No. 11/388,132, filed on Mar. 23, 2006, now Pat. No. 7,572,300.

(51) Int. Cl.
*G01Q 30/00* (2010.01)

(52) U.S. Cl. .................. 216/66; 216/58; 216/2; 216/11; 438/712

(58) Field of Classification Search .................. 216/58, 216/66, 67, 69, 2; 438/712; 900/762, 763; 850/8
See application file for complete search history.

(56) References Cited

U.S. PATENT DOCUMENTS

| | | | |
|---|---|---|---|
| 5,702,822 A * | 12/1997 | Terui et al. ..................... 428/446 |
| 6,457,350 B1 * | 10/2002 | Mitchell .......................... 73/105 |
| 6,605,535 B1 * | 8/2003 | Lee et al. ........................ 438/684 |
| 6,743,408 B2 | 6/2004 | Lieber et al. |
| 6,755,956 B2 | 6/2004 | Lee et al. |
| 6,864,481 B2 | 3/2005 | Kaito et al. |
| 7,119,332 B2 | 10/2006 | Cho et al. |
| 7,170,055 B1 | 1/2007 | Deng et al. |
| 7,357,018 B2 | 4/2008 | Curry et al. |
| 7,735,357 B2 | 6/2010 | Kitazawa et al. |
| 2002/0122766 A1 * | 9/2002 | Lieber et al. ................ 423/447.3 |
| 2003/0112515 A1 * | 6/2003 | Nakabayashi ................ 359/571 |
| 2005/0017171 A1 | 1/2005 | Samuelson et al. |
| 2005/0191427 A1 | 9/2005 | Wade et al. |
| 2005/0269509 A1 | 12/2005 | Collier et al. |
| 2006/0159916 A1 * | 7/2006 | Dubrow et al. ................ 428/357 |
| 2007/0186627 A1 | 8/2007 | Yi et al. |
| 2007/0186628 A1 | 8/2007 | Curry et al. |

(Continued)

FOREIGN PATENT DOCUMENTS

JP 2003287488 A 10/2003

(Continued)

OTHER PUBLICATIONS

Office Action dated Aug. 11, 2011 received in a related U.S. Patent Application, namely U.S. Appl. No. 12/533,427.

(Continued)

*Primary Examiner* — Lan Vinh
*Assistant Examiner* — David Kaufman
(74) *Attorney, Agent, or Firm* — Scully, Scott, Murphy & Presser, P.C.; Vazken Alexanian

(57) ABSTRACT

A scanning probe where the micromachined pyramid tip is extended by the growth of an epitaxial nanowire from the top portion of the tip is disclosed. A metallic particle, such as gold, may terminate the nanowire to realize an apertureless near-field optical microscope probe.

13 Claims, 9 Drawing Sheets

U.S. PATENT DOCUMENTS

2007/0186629 A1  8/2007  Chang et al.

FOREIGN PATENT DOCUMENTS

| | | |
|---|---|---|
| JP | 2005308675 | 11/2005 |
| WO | WO0074107 A2 | 12/2000 |
| WO | WO2005006346 A2 | 1/2005 |

OTHER PUBLICATIONS

Office Action dated Oct. 3, 2011 received in a related U.S. Patent Application, namely U.S. Appl. No. 12/533,427.

Office Action dated Mar. 24, 2011 received in a related U.S. Patent Application, namely U.S. Appl. No. 12/533,427.

Tay, A. B. H. et al., "Fabrication of Super-Sharp Nanowire Atomic Force Microscope Probes Using a Field Emission Induced Growth Technique." Am. Inst. Phys., (2004) pp. 3248-3255, vol. 75, No. 10.

Yang, Guang et al., "Rapid and Reproducible Fabrication of Nanotube/Nanowire AFM Probes by Dielectrophoresis." Am. Phys. Soc. (2004).

"AFM and STM With Nanowire Tips." Nov. 22, 2005.

Martinez, J. et al., "Length Control and Sharpening of Atomic Force Microscope Carbon Nanotube Tips Assisted By and Electron Beam." Inst. Phys. Publ., (2005) 16, pp. 2493-2496.

Supplemental European Search Report dated Feb. 17, 2012 received in a corresponding foreign application.

Letter from IBM Japan which indicates that the date of the issued Office Action is Jun. 5, 2012.

* cited by examiner

MONOLITHIC HIGH ASPECT RATIO NANO-SIZE SCANNING PROBE MICROSCOPE (SPM) TIP FORMED BY NANOWIRE GROWTH

CROSS REFERENCE TO RELATED APPLICATION

This application is a divisional of U.S. patent application Ser. No. 11/388,132, filed Mar. 23, 2006 the entire content and disclosure of which is incorporated herein by reference. This application is also related to co-pending U.S. patent application Ser. No. 12/533,427 filed on Jul. 31, 2009.

FIELD OF THE INVENTION

The present invention relates to scanning microscope probes, and more specifically to a monolithic silicon probe made of an etched silicon pyramid with its tip extended with a Si nanowire. The present invention also relates to methods of fabricating the silicon probe and the nanowire extension.

BACKGROUND OF THE INVENTION

Scanning Probe Microscopy (SPM) techniques such as Atomic Force Microscopy (AFM) and Near-Field Scanning Optical Microscopy (NSOM) are very useful techniques for the study of surfaces. Acquired SPM images provide surface properties (e.g., topography or roughness) on a nanometer scale. As a result, SPM instruments are now used routinely for testing in industries where small dimensions are involved. A typical example is the semiconductor industry where AFM is used to evaluate the surface roughness and topography following a film deposition or a chemical mechanical polishing (CMP) step. Another important application of AFM in the semiconductor industry is the measurement of deep trenches with a very high aspect ratio (height to width ratio of greater than 10.0). The trenches are used for fabricating capacitors, which form the memory cache of a chip.

Most SPM instruments record the surface features using a sharp tip that is fabricated at the end of a cantilever. In general, the surface image is the convolution product between the tip and the features of the surface (the data one wishes to acquire). As such, the "sharper" the tip, the more closely it will approximate a spatial delta function, which will result in a more accurate imaging of the surface.

The actual radius of curvature of the tip's end that should be considered as affecting imaging depends on the type of interaction between the tip and the surface. Many tip-surface interaction decay as $1/r^n$ where r is the distance, and n is a number between 2 to 6. Specifically, and as an example, for a Lennard Jones pair potential between a surface and a sphere, n in the above equation is equal to 3. This is considered a long-range interaction, which suggests that a high aspect ratio tip is required to enhance the instrument's resolution. In other words, since the interaction has a long range, parts of the tip body that are distant from its end (but not necessary from the surface, in the case of a tip with large radius of curvature) also contribute to the measured interaction. A tip with a high length over width aspect ratio minimizes these contributions. In addition, a high aspect ratio tip is required for the inspection of deep trenches.

Conventional AFM tips are fabricated by anisotropic etching of silicon, Si. These tips are formed at the end of a silicon cantilever and have the shape of a pyramid with triangular sides defined by Si (111) surfaces. Since these tips are fabricated by batch silicon processing techniques (also referred to as micromachining), they are sold as full wafers and their cost is in the dollar range. The drawback of these prior art tips is their poor imaging resolution due to their low aspect ratio and large radius of curvature of about 5-30 nm (best case). An example of a pyramidal silicon tip is shown in FIG. 1A. FIG. 1B is a pictorial representation of how an AFM tip is used to map the surface topography. In this drawing, reference numeral 103 represents the analyzed surface, reference numeral 101 represents the Si tip, and reference numeral 102 represents the cantilever. A typical silicon wafer with micromachined AFM probes is illustrated in FIG. 2. In this drawing, reference numeral 201 represents the wafer with micromachined AFM probes, reference numeral 203 denotes the Si tip and reference numeral 202 denotes the cantilever.

To enhance the resolution, a carbon nanotube (CNT) can be glued to the end of a conventional Si tip (See, for example, J Martinez et al., "Length control and sharpening of atomic force microscope carbon nanotube tips assisted by an electron beam", Nanotechnology 16 (2005) 2493-2496). The use of a CNT provides not only a small radius of curvature, but also a high aspect ratio probe. However, due to their manual fabrication the cost of a probe with a mounted CNT tip is roughly 1000× of a conventional micromachined AFM tip.

In view of the foregoing, there is a need for a batch fabrication process that yields CNT like AFM tips (i.e., with a radius of curvature of a few nanometers and an aspect ratio of 1:100) at the cost of a conventional micromachined AFM tip.

SUMMARY OF THE INVENTION

The present invention provides high aspect ratio nanometer size tips that are fabricated by growing a nanowire from the end of a conventional micromachined Si AFM tip. The grown nanowires (or nanostructures) are extensions of the Si tip and are not glued onto the Si tip as is the case with prior art probes. Thus, the inventive structure lacks a seam between the Si tip and the nanowire, which seam is present in prior art structure where the CNT is glued to the Si tip.

The inventive structure and methods described herein provide several advantages over the prior art. First, the fabrication of the tips is a batch process in which all steps are conventional silicon processing steps. As such, many tips can be fabricated in parallel on a single silicon wafer as illustrated by FIG. 2. As a result, the cost of the manufactured tip is expected to be low and similar to that of a micromachined AFM tip. Moreover, the performance delivered by the tip disclosed in the present invention is that of a high aspect ratio nanometer size radius tip that currently cost 1000× more than a conventional micromachined tip.

Second, the inventive silicon nanowire is grown epitaxially (i.e., from the same crystal structure) from the tip of the micromachined AFM tip. As such, there is a seamless interface between the AFM tip and the nanowire. This gives the inventive tip a reliability and durability advantage over prior art tips where a CNT is glued to the end of the AFM tip.

Third, nanowires of different materials (e.g., Ge or GaAs) can be easily grown epitaxially on the silicon AFM tip allowing different chemical terminations for the probe, and also different mechanical properties.

Fourth, and for the application of an apertureless near-field optical microscope, the metallic (e.g., gold) particle at the end of the inventive tip forms a resonance nanometric scatterer which is required to enhance the electric laser field at the end of the tip. The size of that metallic particle can be enlarged by plating where the original metallic particle serves as a seed layer.

In a first aspect of the present invention, a micromachined silicon tip extended by epitaxial growth of a single-crystal nanowire is described. The inventive tip comprises a cantilever on which a silicon pyramid is formed by anisotropic etching of silicon. At the top point of the pyramid, a single-crystal nanowire is formed by epitaxial growth.

In some embodiments of the present invention, the epitaxial nanowire can include a material other than silicon. For example, a segment of the nanowires can be formed of at least one other semiconductor such as Ge, InAs, GaAs, or a crystalline oxide such as ZnO, $In_2O_3$, $WO_3$, so different chemical termination for the probe can be obtained. Additionally, the electronic properties of the inventive tip, such as conductivity (or insulation), can also be tailored by the choice of different materials and/or doping of the nanowire.

In a second aspect of the present invention, methods for fabricating a monolithic micromachined silicon tip with a nanowire extension are described. In one of the inventive methods, a wafer with an array of conventional micromachined silicon tips is used as a staring wafer. A catalyst such as, for example, gold is used to promote the growth of the nanowires from the top of the Si pyramids. The catalyst is deposited over the silicon pyramid by methods such as plating or evaporation. The growth of each of the nanowires is preferably carried out by chemical vapor deposition chamber (CVD), which allows many wafers to be processed simultaneously. Finally, an optional directional etch such as reactive ion etching (RIE) is used to clean up the nanowires that have nucleated on the silicon pyramid sides.

Although the methods of the present invention are described using nanowires, the inventive methods can also be practiced with other highly anisotropic crystals such as carbon nanotubes, nanorods, or other like nanostructures. The term "highly anisotropic" refers to the morphology of the crystal or structure. For example, nanowires, or whiskers are usually regarded as filamentary crystals with a very high (larger than 10) ratio of length L to diameter d. In the examples provided herein, the nanowires consist of a single-crystal Si body, with a typical diameter d equal to 10 nm and a length L equal to 700 nm. The specifics of the growth, such as catalyst, used to promote the nanotube growth (typically iron oxide) and the growth temperature (typically about 900° C.) are somewhat different than that of silicon nanowires. Yet, the principle of extending the micromachined silicon tip by epitaxial growth of a highly anisotropic crystal remains the same.

BRIEF DESCRIPTION OF THE DRAWINGS

FIG. 6A is of the entire micromachined pyramid, while FIG. 6B represents the portion with the dotted box shown in FIG. 6A.

DETAILED DESCRIPTION OF THE INVENTION

The present invention, which provides a monolithic high aspect ratio nanometer-size scanning probe tip, as well as methods for fabricating the same, will now be described in greater detail by referring to the following discussion. In this discussion, reference will be made to FIGS. 2-7B that illustrate embodiments of the present invention. Since the drawings of the embodiments of the present invention are provided for illustrative purposes, the structures contained therein are not always drawn to scale.

It is again emphasized that the methods of the present invention are described using silicon nanowires and silicon processing. The inventive methods can also be practiced with other highly anisotropic crystals such as, for example, carbon nanotubes and metal-oxide whiskers. When non-Si nanowires/nanotubes are used, the processing steps of the present invention are basically the same except that the growth temperature, precursors, and the type of catalyst used may be different. It is, however, noted that in most applications the use of silicon nanowires is preferred due to the compatibility with the well establish silicon-processing technology.

Figure 1A:
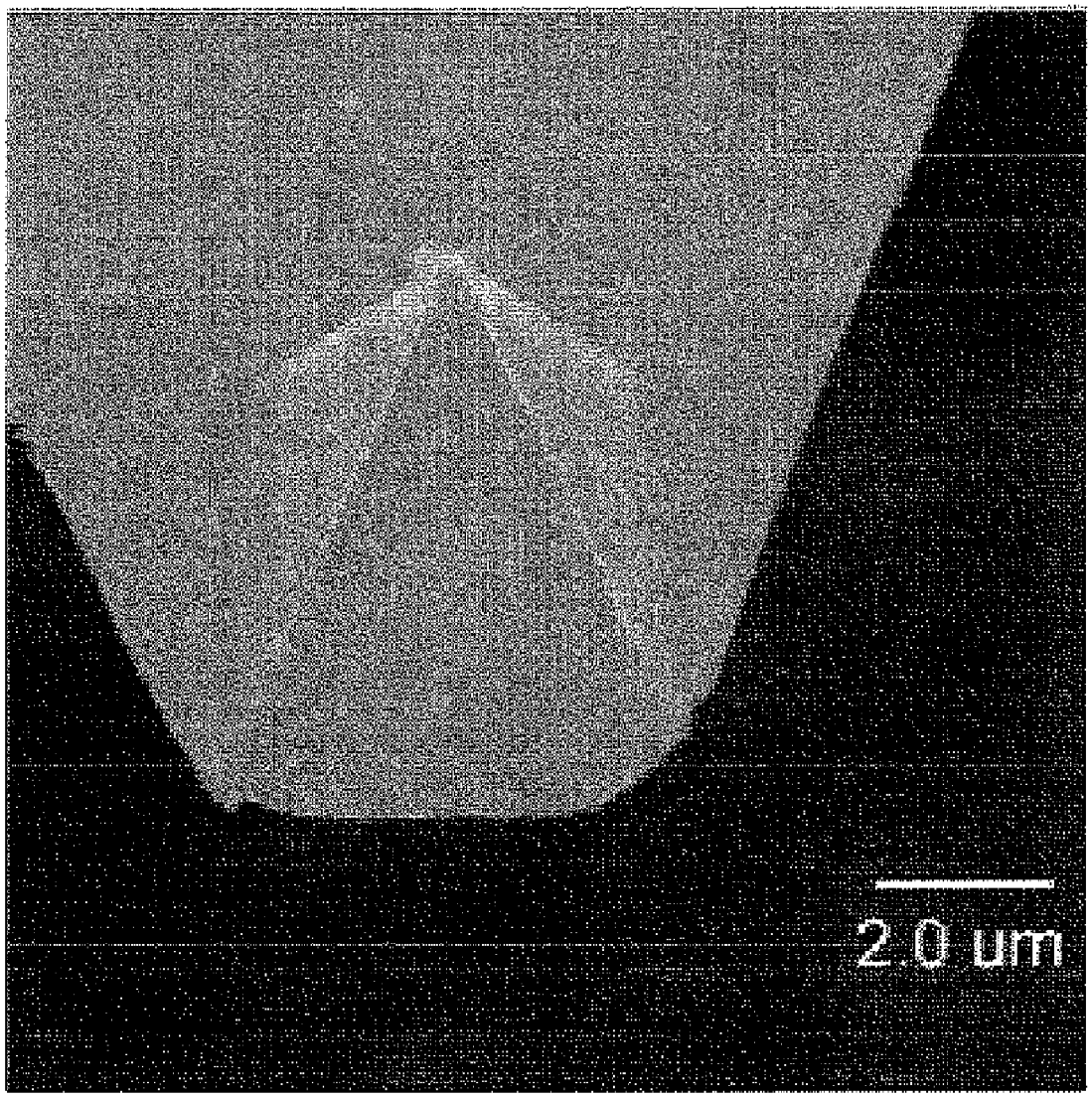
FIG. 1A is a scanning electron microscope (SEM) image of a micromachined AFM tip.
Figure 1B:
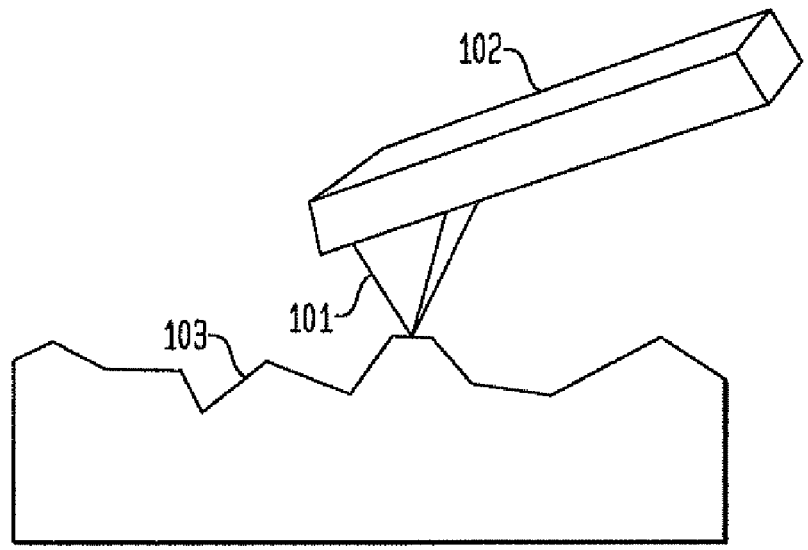
FIG. 1B is a pictorial representation illustrating how an AFM tip is used for mapping the surface topography.
Figure 2:
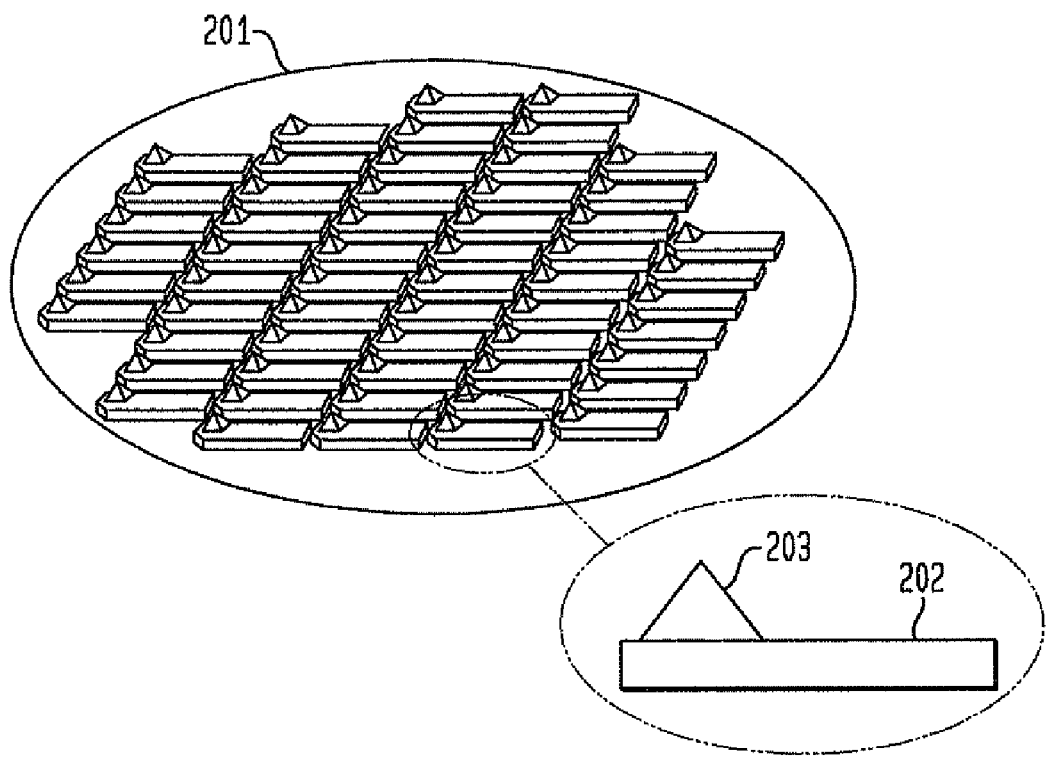
FIG. 2 is a pictorial representation of an array of micromachined AFM silicon tips.

The present invention will now be explained in greater detail by referring to FIGS. 2-7B. Specifically, FIG. 2 shows a silicon wafer 201 with an array of micromachined AFM probes which is employed in the present invention as the starting substrate. Each of the AFM probes comprise a cantilever 202 and a pyramidal silicon tip 203. The pyramidal silicon tip 203 is typically formed by anisotropic etching of silicon. For example, a masked etching of silicon with potassium hydroxide (KOH) exhibits a very slow etching of Si (111) planes. As a result, a pyramid which sides are Si (111) planes forms.

Figure 3A:
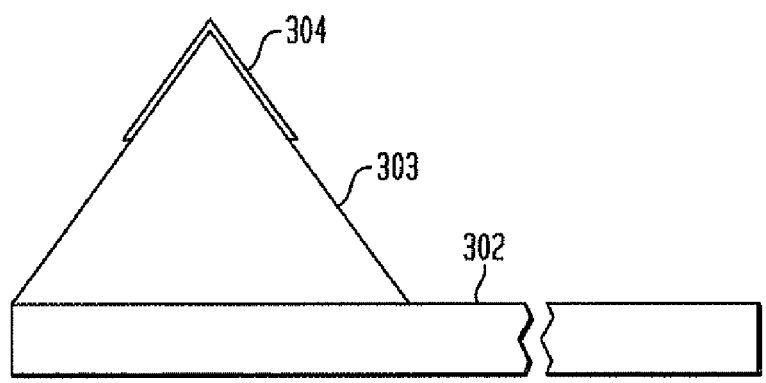
FIGS. 3A-3C are pictorial representations of a first embodiment illustrating the basic processing steps used in the present invention for fabricating a scanning probe with a nanowire extension.

Referring to FIG. 3A, a metallic film 304 is deposited on the top portion of the silicon tip 303 that is located atop cantilever 302. The metallic film includes Au, In, Ti, and Al, with Au being particularly preferred in the present invention. The metallic film is used as a catalyst for the growth of nanowires. The metallic film deposition can be performed by methods such as evaporation or plating. A photoresist mask is typically used to define the region where the metallic film is deposited.

Figure 3B:
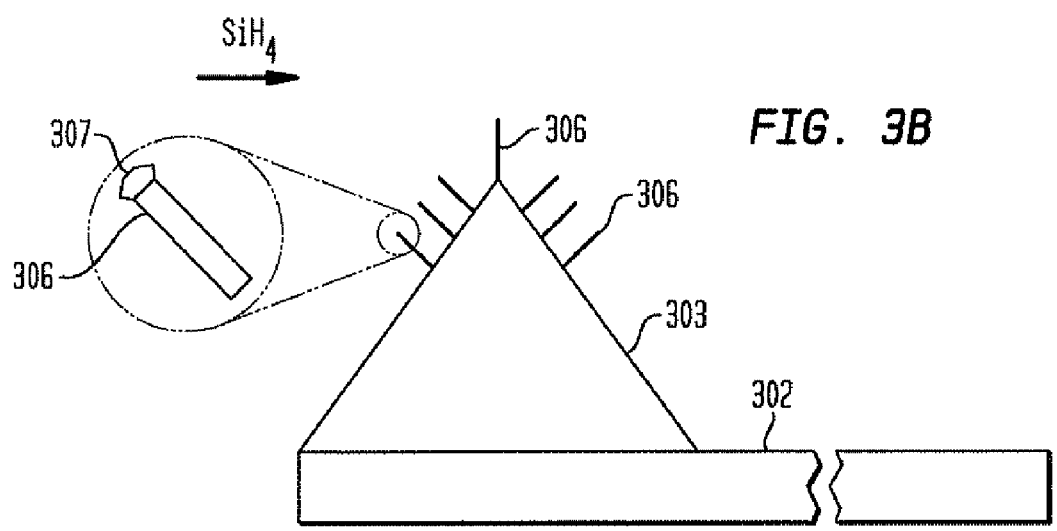

Referring to FIG. 3B the growth of the nanowires 306 is assisted by a metallic catalyst 307 and is typically carried out by chemical vapor deposition (CVD) or plasma enhanced chemical vapor deposition (PECVD). The nanowires 306 of the present invention typically have a length over diameter aspect ratio of greater than 10. Prior to the nanowires growth, annealing (typically at 370°-550° C.) is used to agglomerate the metallic film 304 into small metallic-silicon eutectic droplets. The droplets, in turn, form the metallic catalyst 307 that promotes the nanowire growth.

One draw back of the film agglomeration approach described above is that a relatively broad distribution of catalyst sizes is obtained. An alternative approach to introduce the catalyst on top of the silicon tip is by spin-coating of a metallic colloid. An advantage to the use of metallic colloids is the uniform size of the metallic particles; the particles typically fall within a narrow size range with a variation smaller than 8%.

The nanowires growth temperature depends on the precursor used. For example, when silane ($SiH_4$) is used to grow silicon nanowires, the growth temperature is typically from about 370° C. to about 500° C. For other precursors such as, for example, silicon tetrachloride ($SiCl_4$), the growth temperature is typically from about 800° C. to about 950° C. By adding chlorine to $SiH_4$, the growth temperature can be raised to above 600° C. The growth rate of the nanowires 306 depends on the growth temperature and the gas pressure in the growth chamber. For example, a typical CVD growth rate of silicon nanowires grown with $SiH_4$ diluted with $H_2$ (1:1) at a pressure of 1 torr and a growth temperature of 450° C. is about 7.6 µm/hour.

The anisotropic growth of the nanowires is best described by the vapor-liquid-solid (VLS) mechanism. See, for example, E. I. Givargizov, "Highly Anisotropic Crystals", Kluwer Academic Publishers, Norwell, Mass., 1986. When the growth is initiated, a metallic-silicon liquid alloy is formed. With additional supply of Si from the gas phase (e.g., $SiH_4$), the metallic-silicon droplet becomes supersaturated with Si and the excess silicon is deposited at the solid-liquid interface. As a result, the liquid droplet rises from the original substrate surface to the tip of a growing nanowire crystal. If the growth temperature is kept below about 500° C. (if, $SiH_4$ is used), or alternatively, a chlorine additive is used, no deposition of silicon take places on the pyramid sides.

The pyramid sidewalls of the micromachined silicon tips 303 are defined by Si (111) planes since the pyramid is typically fabricated by an anisotropic etch of silicon. The nanowires 306 mostly tend to grow perpendicular to the (111) plane as illustrated by FIG. 3B.

Figure 3C:
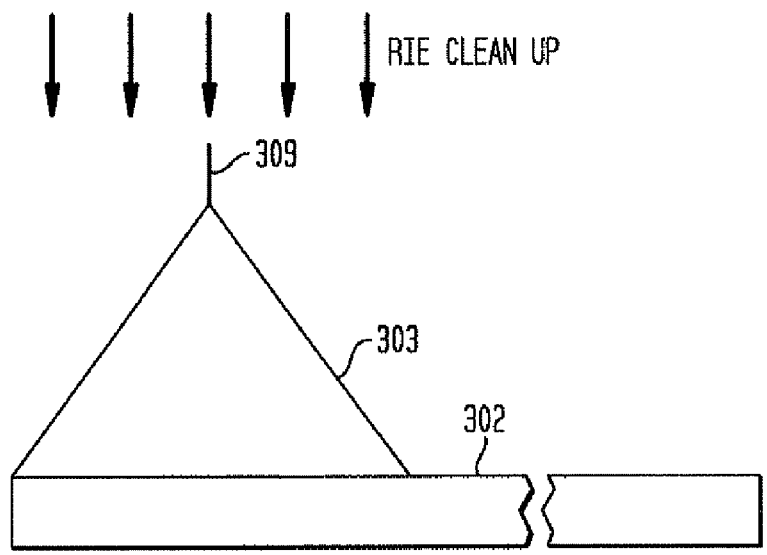

Referring to FIG. 3C, the clean-up of all non-vertical nanowires is carried out by a directional etch such as reactive ion etching (RIE). The duration of the etching process is timed to be such that the amount of Si removed will be larger than $d/\sin(\theta)$, where d is the nanowire diameter, and $\theta$ is the angle of the pyramid side with respect to the substrate surface. Only near vertical nanowires 309 survive the etching process. For most RIE chemistries, it is possible to substantially over etch since the vertical nanowires are protected by the metallic catalyst 307 which serves as an etch resistive mask.

Figure 3D:
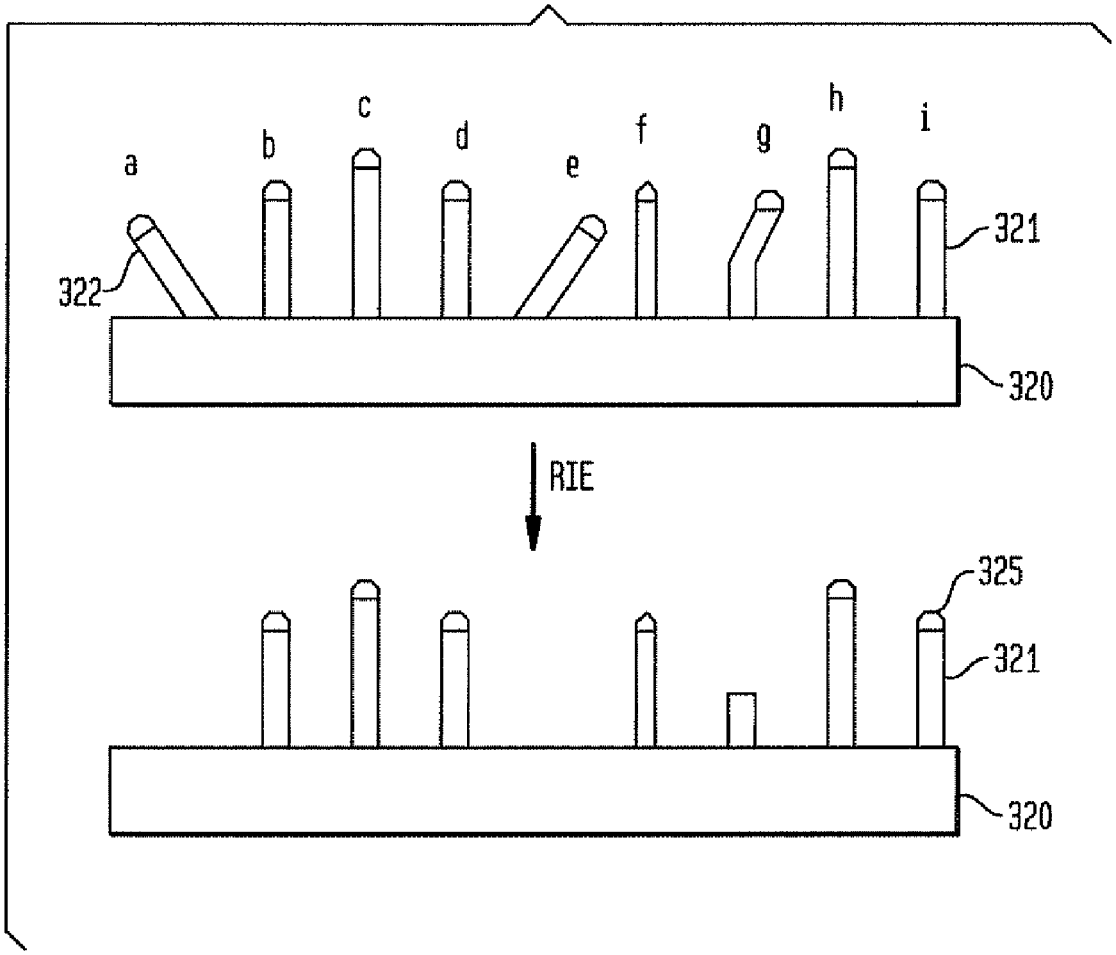
FIG. 3D is a pictorial representation of the directional RIE process used to remove non-vertical nanowires.

The RIE clean-up of non-vertical nanowires is illustrated in FIG. 3D. The substrate 320 host two groups of nanowires. The first group 321 consist of nanowires {b, c, d, f, h, i} that are perpendicular to the substrate surface. Since substrate 320 is horizontal, these nanowires are considered vertical. The second group 322 of nanowires, {a, e, g}, have at least one portion that is at an angle other than 90 degrees with respect to the substrate 320. These nanowires are therefore considered as non-vertical. Applying a directional RIE to substrate 320, with the ion beam being perpendicular to the substrate and thus parallel to the vertical nanowires mainly etches the nanowires of the second group {a, e, g} (i.e., nanowires containing a non-vertical portion). Due to the ion beam directionality, the vertical nanowires are not etched. Additionally, as explained above, the vertical nanowires body is further protected from etching by the metallic catalyst 325 at the tip of the nanowires.

Figure 3G:
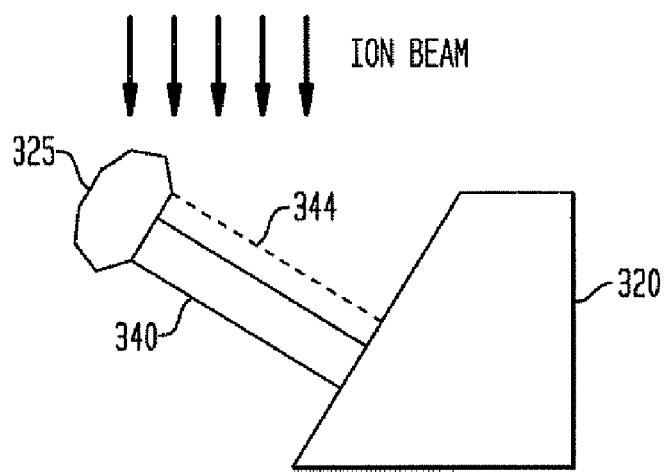
FIG. 3G is a pictorial representation illustrating the partial etching of the nanowire.
Figure 3E:
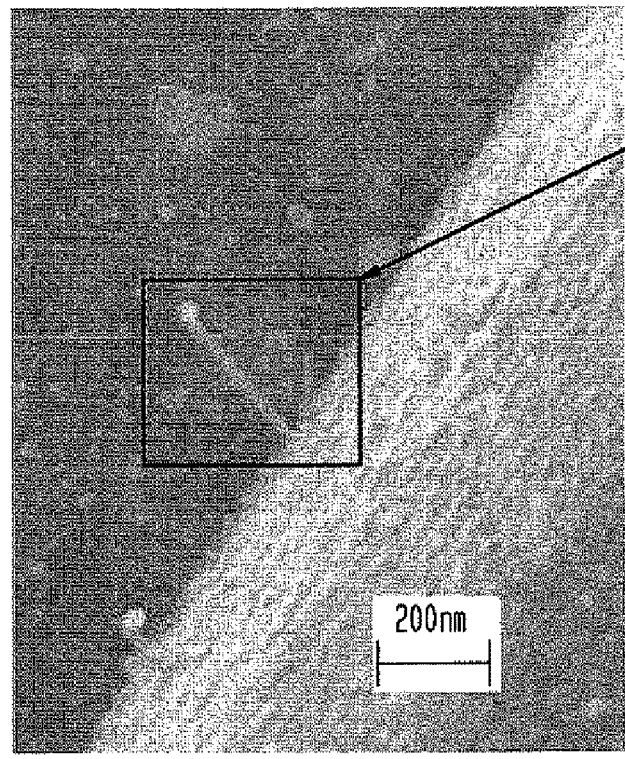
FIGS. 3E-3F are scanning electron microscope (SEM) images showing a partially etched nanowire, following a directional RIE used to remove nanowires not parallel to the ion beam. The imaged nanowire survived the etching since its' as-grown diameter exceeded the amount of silicon removed by RIE. The SEM image shown in FIG. 3E shows more of the structure, while the SEM image of FIG. 3F shows the image within the boxed region shown in FIG. 3E.
Figure 3F:
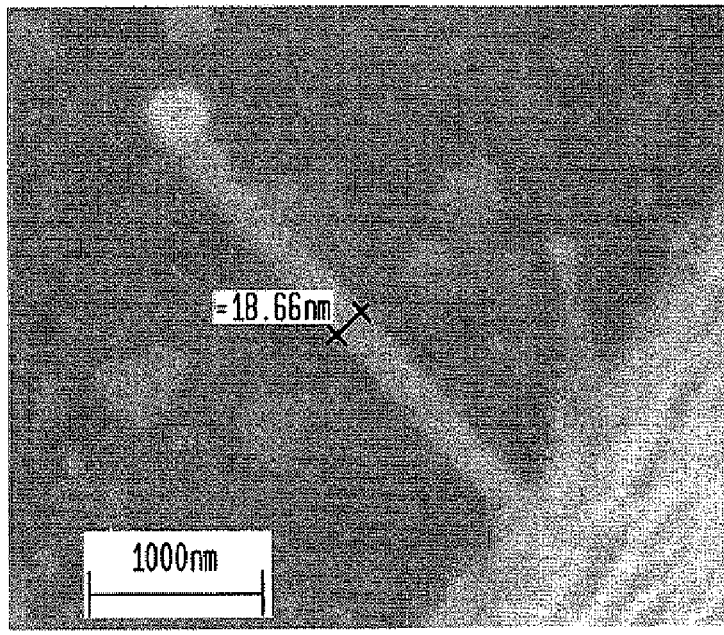

FIGS. 3E-3F shows a scanning electron microscope (SEM) image of a partially etched non-vertical silicon nanowire. FIG. 3G shows a pictorial representation of the partial etching of the nanowire. In this drawing, reference numeral 325 denotes the catalyst particles, reference numeral 340 denotes the partially etched nanowire, the area within region 344 bounded by the dotted lines denotes the portion of the original nanowire that was etched, and reference numeral 320 denotes the substrate. The nanowire growth direction is perpendicular to the pyramid side that consists of a Si (111) surface. The nanowire original thickness was about 30 nm. For this sample, RIE with $CF_4$ chemistry was used for etching the non-vertical nanowires. The total etching time was set to remove about 12 nm of silicon since most nanowires on this sample had a diameter of about 10 nm. As the image shows, the as grown 30 nm thick nanowire is partially etched with about 18 nm of Si remaining. The nanowire survived the etching since its' as grown diameter exceeded the amount of silicon removed by RIE.

There are several approaches to limit the nanowires growth to the top portion of the micromachined silicon pyramid. One approach, which was discussed earlier, is the use of conventional lithography to limit the deposition of the metallic catalyst to the top portion of the Si pyramid. It is noted that this approach can only be exercised on a coarse scale due to the large topography introduced by the micromachined silicon. The large topography leads to coarse lithography due to the use of relatively thick photoresist and the limited depth of focus. Given these issues, additional methods to limit the nanowire growth to the tip portion of micromachined silicon pyramid are described herein below.

It is known that nanowires will not nucleate if the metallic film is below some critical thickness. This can be exploited to obtain nanowire growth just from the top of the silicon pyramid, if one can deposit a thicker metallic film at the top of the pyramidal tip than on the sidewalls. The thickness of the metallic film over the sides should be kept below the critical thickness for nanowire nucleation. The critical thickness depends on the growth details. For the growth conditions demonstrated in this work, little nucleation of nanowires was found if the deposited metallic thickness was less than about 1 nm.

Figure 4A:
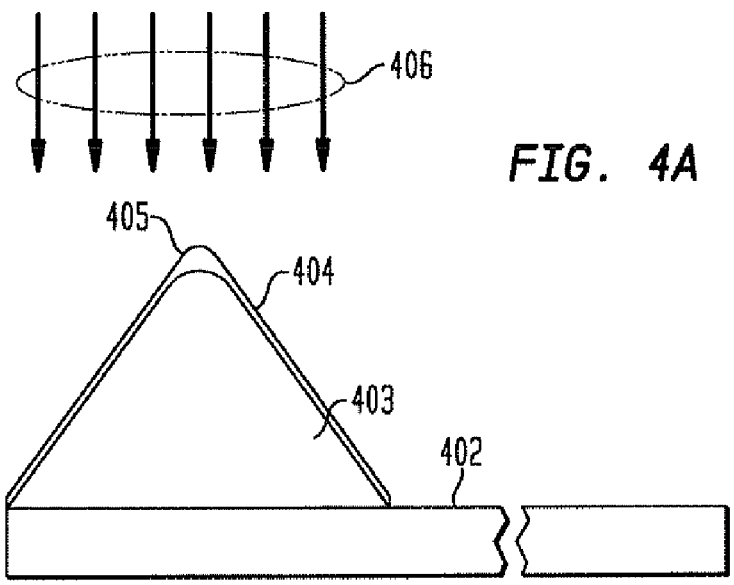
FIGS. 4A-4B are pictorial representations of another embodiment of the present invention in which different deposition rates on the top of the silicon pyramid and on its' sides are exploited to limit the nanowires growth to the top of the pyramid.
Figure 4B:
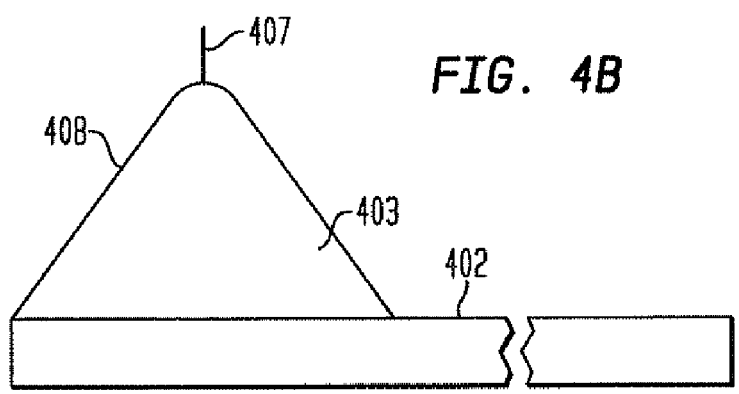

Referring to FIGS. 4A-4B the metal is deposited on the Si tip 403 (located on cantilever 402) by line-of-sight evaporation 406. As a result, the metal on the sidewall 404 is thinner than the metal over the tip summit 405. For Si (111) the thickness of the metal on the sidewall is about 0.58 of the metal thickness over the summit. While this ratio is not very large, it is still possible to controllably deposit 1.5 nm of metal over the tip summit 405 and obtain only 0.86 nm over the sides 404. As such, little or no growth of nanowires is obtained on the sidewall since the metal thickness is below the critical thickness of about 1 nm.

Another method that would lead to a thickness difference is plating. With plating the electric field (and thus current) is enhanced by the tip end, leading to more metal deposition at the summit.

Figure 5A:
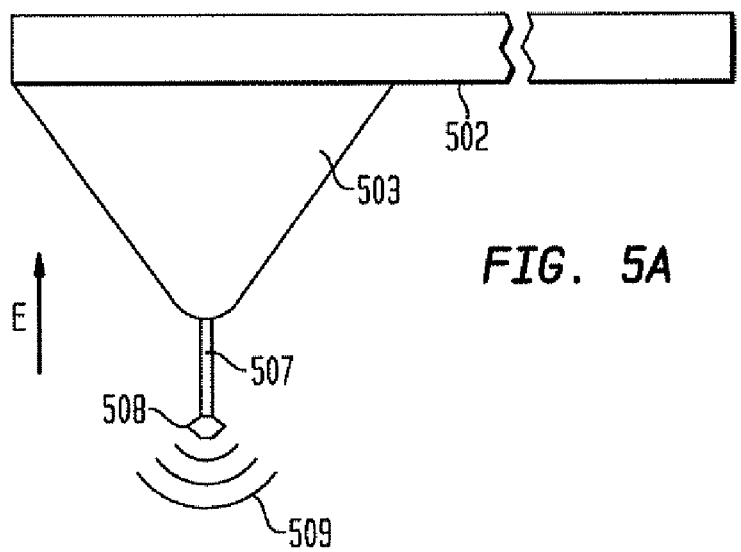
FIG. 5A is a pictorial representation of an apertureless near-field optical microscope tip realized by growing a nanowire from the end of a silicon pyramidal tip using one of the methods of the present invention. The metallic particle at the end of the nanowire forms the resonance ellipsoid that is used to enhance the optical field.
Figure 5B:
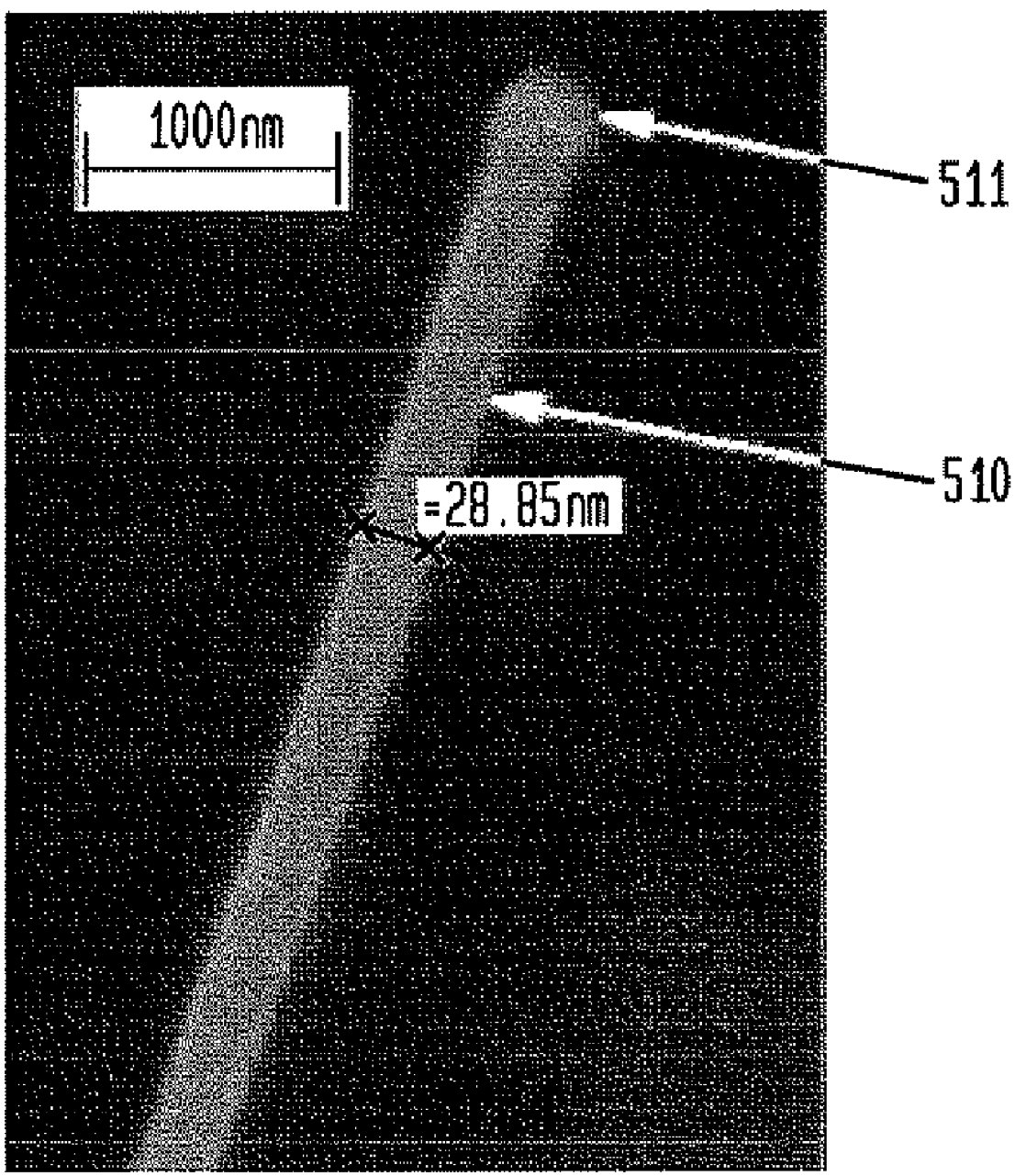
FIG. 5B is a scanning electron microscope (SEM) image of an inventive single-crystal silicon nanowire with a metallic particle at its tip.

FIG. 5A illustrates another embodiment where the nanowire 507 and the metal particle 508 form an apertureless near-field optical microscope probe. In this drawing, reference numeral 503 denotes the Si tip and reference numeral 502 denotes the cantilever. The metal particle at the end of the nanowire tip forms a very efficient nanometric resonance scatterer, which enhances the optical field E that excites the scatterer. Reference numeral 509 denotes the local electrical field enhancement that is generated using this technique. The optical field should be polarized along the probe axis and its frequency should be matched to the plasmon resonance frequency of the metallic particle. For example, for a small spherical gold particle the electrical field can be quite effectively enhanced by exciting the surface plasmon resonance at a wavelength of approximately 500 nm. It is noted that the metallic particle 548 defines the nanowire diameter during growth (see SEM image FIG. 5B; reference numeral 511 denotes the metallic particular and reference numeral 510 denotes the Si nanowire). If needed, after the nanowire growth is completed, the size and potentially shape of the metallic particle 508 can be tuned by electroless plating with the original metallic particle serving as a seed.

The following example is provided to illustrate the inventive monolithic silicon probe in greater detail.

EXAMPLE

Figure 6A:
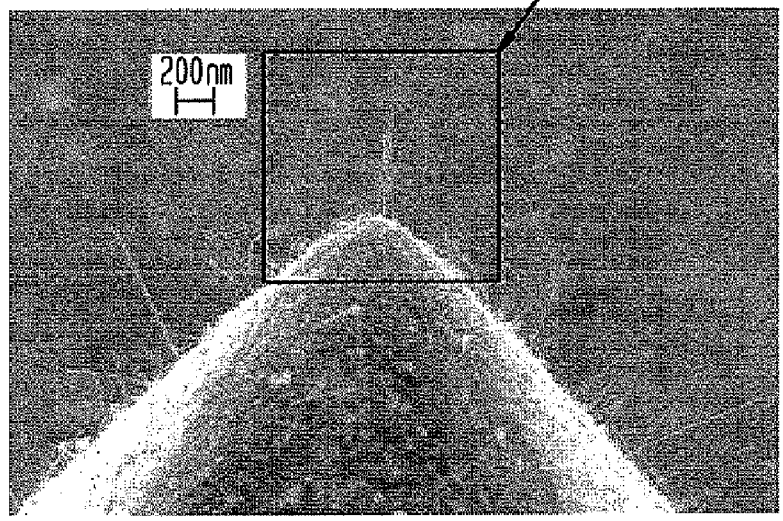
FIGS. 6A and 6B are scanning electron microscope images of a micromachined silicon pyramid following the CVD growth of Si nanowires.
Figure 6B:
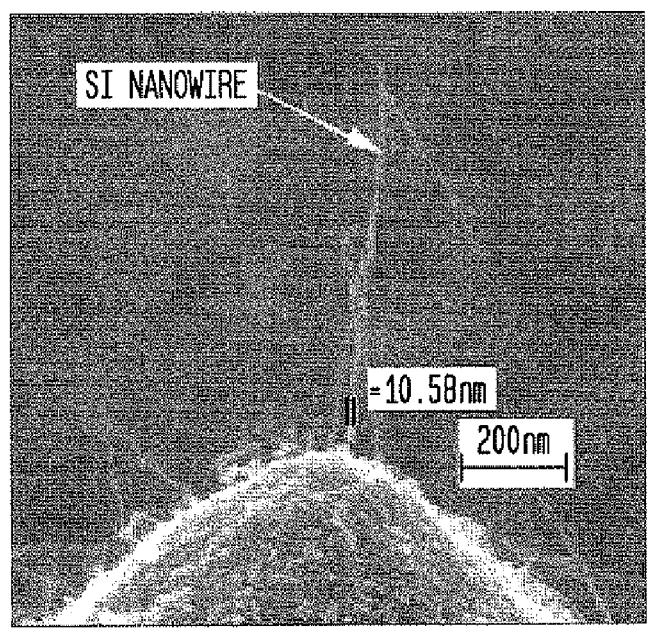

In this example, a micromachined silicon pyramid extended by a silicon nanowire using the method outlined in FIGS. 3A-3C was provided. Specifically, a silicon wafer was masked and etched in KOH to form silicon pyramids. The native oxide was removed by an HF dip and a 2 nm thick gold film was evaporated over the silicon pyramid. The wafer was then loaded into an UHV-CVD furnace. A pre-growth anneal at 500° C. in $H_2$ ambient for 10 minutes was used to agglomerate the Au film into AuSi eutectic droplets. The furnace temperature was then lowered to the nanowire growth temperature of 420° C. Pure silane ($SiH_4$) at a pressure of 2 torr was used as the precursor. FIGS. 6A-6B are SEM images showing a silicon pyramid following the growth. The typical length of the silicon nanowires is about 700 nm and their typical diameter is about 10-12 nm.

Figure 7A:
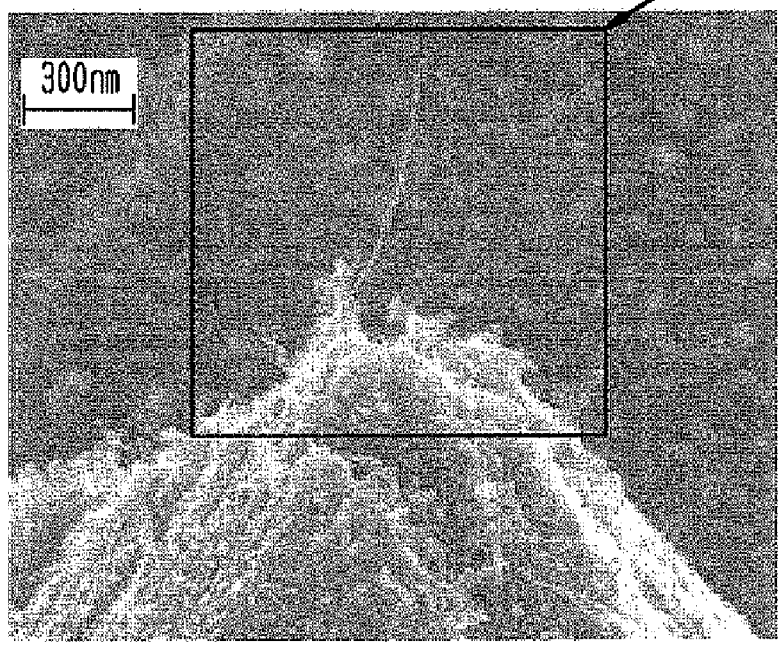
FIGS. 7A-7B are scanning electron microscope images of a micromachined silicon pyramid following the removal by RIE of non-vertical nanowires.
Figure 7B:
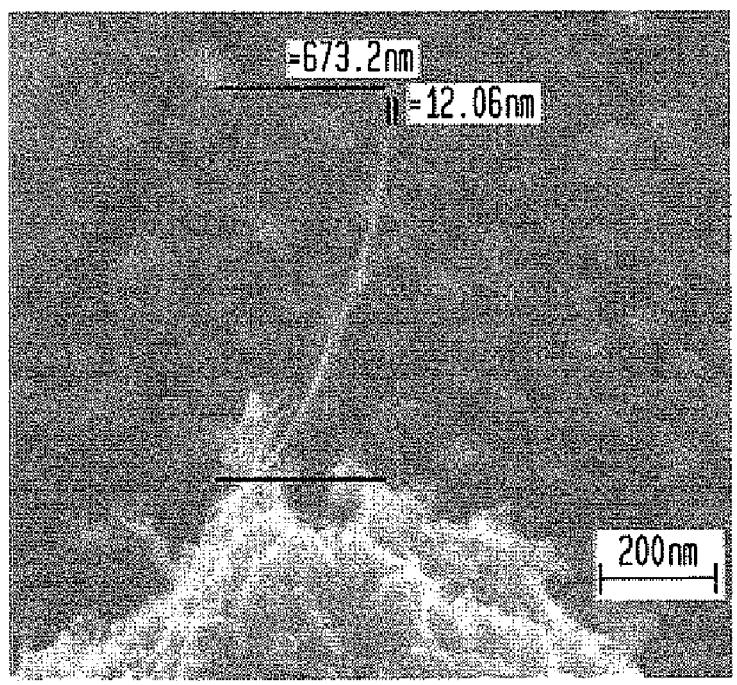

Following the growth the wafer was etched by RIE using $CF_4$ chemistry. As can be seen in FIGS. 7A-7B the non-vertical nanowires are etched off the pyramid sides leaving only a vertical nanowire.

While the present invention has been particularly shown and described with respect to preferred embodiments thereof it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A method for obtaining all-parallel nanowires comprising:
    providing an array of micromachined probes, wherein each micromachined probe of said array includes a cantilever and a pyramidal silicon tip;
    growing a plurality of nanowires on exposed surfaces of said pyramidal silicon tip including an uppermost horizontal surface and sidewall surfaces, wherein a subset of said plurality of nanowires are parallel and wherein said growing said plurality of nanowires comprises forming a metal catalyst having a first thickness atop the uppermost horizontal surface of said pyramidal silicon tip and a second thickness on said sidewall surfaces wherein said first thickness is greater than said second thickness and said second thickness is below a critical thickness for nanowire growth;
    aligning said pyramidal silicon tip such that said subset of parallel nanowires is parallel to a reactive ion etching beam; and
    etching nanowires having at least one segment that is non-parallel to the reactive ion etching beam from said uppermost horizontal surface and said sidewall surfaces of said pyramidal silicon tip.

2. The method of claim 1 wherein said growing of said plurality of nanowires further includes chemical vapor deposition or plasma enhanced chemical vapor deposition.

3. The method of claim 1 wherein said metallic catalyst is formed by plating.

4. The method of claim 1 wherein said metallic catalyst is a gold catalyst.

5. The method of claim 1 wherein metallic catalyst is annealed prior to deposition of said plurality of nanowires.

6. The method of claim 5 wherein said annealing is performed at a temperature from 370° C. to 550° C.

7. The method of claim 1 wherein each of said plurality of nanowires has a length over diameter aspect ratio of greater than 10.

8. The method of claim 1 wherein said growing is performed at a temperature from 370° C. to 500° C.

9. The method of claim 1 wherein said growing is performed at a temperature from 800° C. to 950° C.

10. The method of claim 1 wherein said growing of said plurality of nanowires includes silicon tetrachloride as a precursor and optionally chlorine.

11. The method of claim 1 wherein growing said plurality of nanowires is by epitaxy.

12. The method of claim 1 wherein said etching is performed by a direction etching process.

13. The method of claim 12 wherein said direction etching process includes reactive ion etching.

* * * * *